United States Patent
Tokumoto

(10) Patent No.: US 10,289,828 B2
(45) Date of Patent: May 14, 2019

(54) IMAGE FORMING APPARATUS, IMAGE FORMING SYSTEM, METHOD FOR CONTROLLING IMAGE FORMING SYSTEM, AND STORAGE MEDIUM

(71) Applicant: CANON KABUSHIKI KAISHA, Tokyo (JP)

(72) Inventor: Hirokazu Tokumoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 15/668,592

(22) Filed: Aug. 3, 2017

(65) Prior Publication Data

US 2018/0039772 A1 Feb. 8, 2018

(30) Foreign Application Priority Data

Aug. 5, 2016 (JP) .................................. 2016-154414

(51) Int. Cl.

| G06F 21/44 | (2013.01) |
|---|---|
| G06F 21/34 | (2013.01) |
| G06F 21/80 | (2013.01) |
| H04N 1/44 | (2006.01) |
| G06F 21/60 | (2013.01) |
| G06F 16/583 | (2019.01) |

(52) U.S. Cl.
CPC ............ *G06F 21/34* (2013.01); *G06F 21/608* (2013.01); *G06F 21/80* (2013.01); *H04N 1/4426* (2013.01); *G06F 16/583* (2019.01); *G06F 2221/2129* (2013.01); *H04N 1/4433* (2013.01); *H04N 2201/0087* (2013.01); *H04N 2201/0094* (2013.01)

(58) Field of Classification Search
CPC ........... H04L 63/00; G06F 21/44; G06F 21/30
See application file for complete search history.

(56) References Cited

U.S. PATENT DOCUMENTS

| 8,780,377 B2 * | 7/2014 | Nishida ................. G06F 3/1222 |
|---|---|---|
| | | 358/1.14 |
| 2017/0097799 A1 * | 4/2017 | Okumura .............. G06F 3/1203 |

FOREIGN PATENT DOCUMENTS

| JP | 2007-080295 A | 3/2007 |
|---|---|---|
| JP | 4429966 B2 | 3/2010 |
| JP | 2010-211627 A | 9/2010 |
| JP | 2015-108925 A | 6/2015 |
| JP | 2016-107512 A | 6/2016 |

\* cited by examiner

*Primary Examiner* — Izunna Okeke

(74) *Attorney, Agent, or Firm* — Canon U.S.A., Inc. IP Division

(57) ABSTRACT

In an image forming system including a storage machine, an authentication server machine, and an output machine, when the output machine performs printing of print data stored in the storage machine, the output machine transmits a device token to the storage machine to request the storage machine for the print data. The storage machine transmits the device token to the authentication server machine to determine whether the device token is valid. When the device token is determined to be valid, the print data is transmitted to the output machine.

10 Claims, 10 Drawing Sheets

FIG.5

| JOB NAME | STORED LOCATION | | RECEPTION DATE AND TIME | PRINT SETTING | | | |
|---|---|---|---|---|---|---|---|
| | IP ADDRESS | DOCUMENT ID | | PAPER SIZE | MULTIPLE PAGE | COPIES | TWO-SIDED |
| index.html | localhost | 12345678 | 2015.03.12 12:34 | A4 | 1 in 1 | 1 | ONE-SIDED |
| MATERIAL FOR DISCUSSION.pdf | 192.168.0.1 | 90123456 | 2015.03.11 8:30 | A4 | 2 in 1 | 1 | ONE-SIDED |
| PROJECT MEETING.docx | 192.168.0.2 | 78901234 | 2015.03.10 17:21 | A3 | 1 in 1 | 30 | ONE-SIDED |
| BUDGET CONTROL.xlsx | 192.168.0.3 | 56789012 | 2015.03.10 11:34 | A4 | 1 in 1 | 3 | ONE-SIDED |

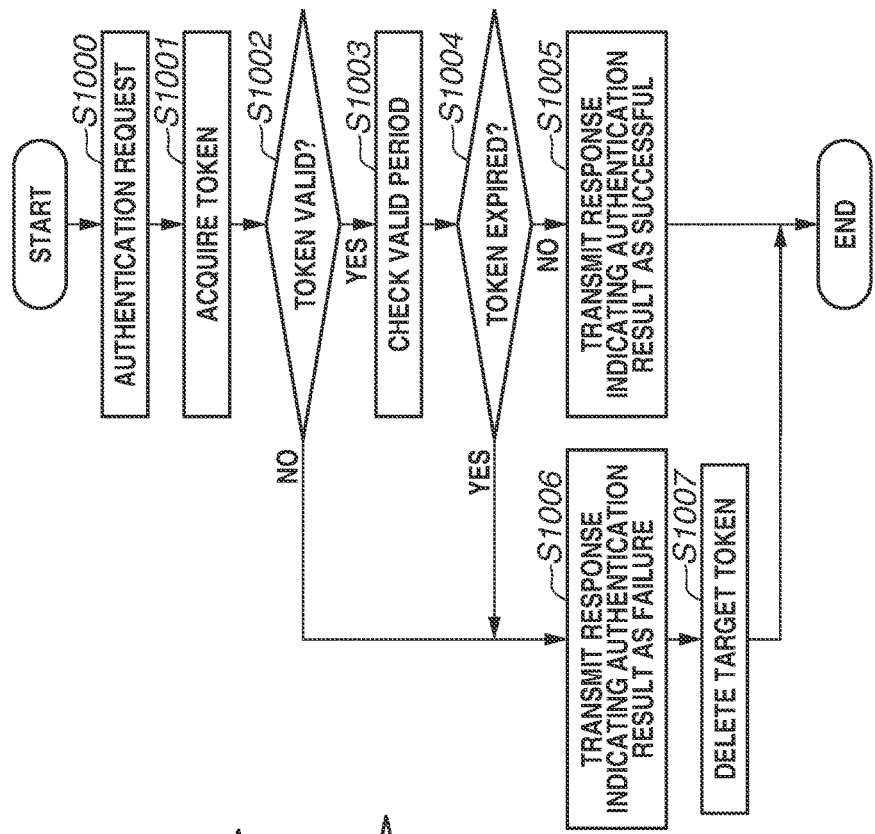
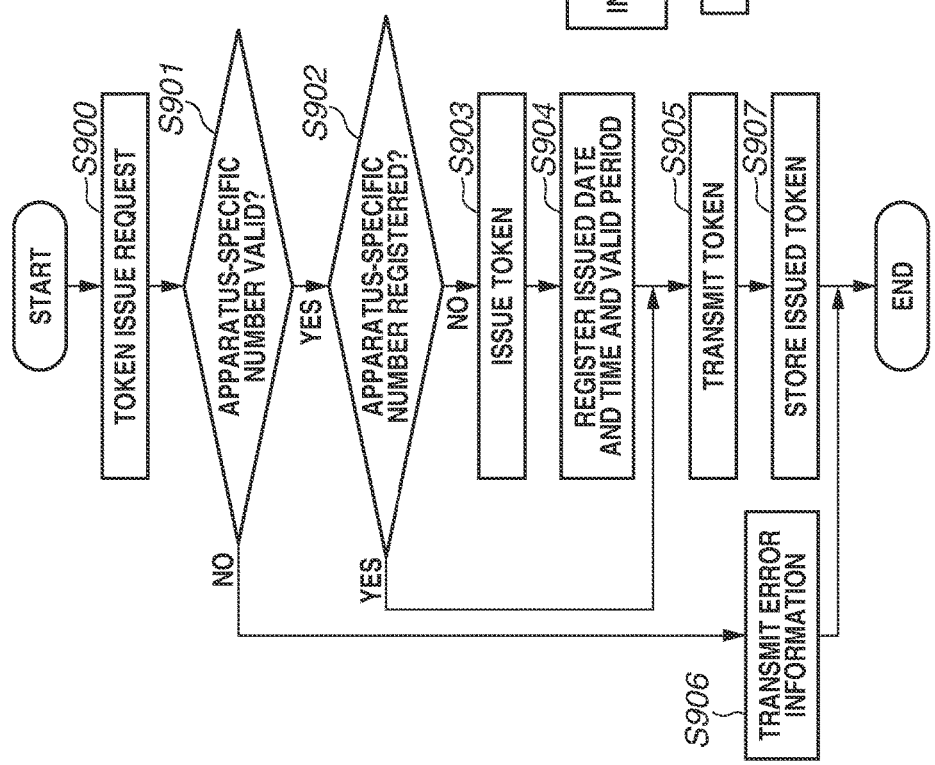

FIG.10

| ACCESS TOKEN STORAGE PATH 1000 | SERIAL ID 1001 | ISSUED DATE AND TIME 1002 | VALID PERIOD 1003 | AUTHENTICATED TIMES 1004 | AUTHORIZED TIMES 1005 |
|---|---|---|---|---|---|
| /db/token/aaa | AAA123456 | 2015.03.12 12:34 | 72:00:00 | — | — |
| /db/token/bbb | BBB123456 | 2015.03.11 8:30 | — | 2 | 3 |
| /db/token/ccc | CCC123456 | 2015.03.10 17:21 | 3:00:00 | — | — |
| /db/token/ddd | DDD123456 | 2015.03.10 11:34 | — | 0 | 1 |

IMAGE FORMING APPARATUS, IMAGE FORMING SYSTEM, METHOD FOR CONTROLLING IMAGE FORMING SYSTEM, AND STORAGE MEDIUM

BACKGROUND

Field

The present disclosure relates to an image forming apparatus, an image forming system, a method for controlling an image forming system, and a storage medium.

Description of the Related Art

Conventional multi function peripherals (MFPs), as information processing devices, have immediately printed and output print data upon receiving the print data from a terminal device such as a personal computer. This has led to a printed object being left on the MFP. The printed object left on the MFP can be seen by someone other than the user who initiated the print job, and thus raises a potential risk of information leakage.

In view of the above, hold printing has been employed to prevent printed objects from being left on the machine. More specifically, print data is not immediately printed upon receipt, and is printed and output after receipt of a print instruction request input by a user via an operation unit of the MFP.

A system employing remote hold printing as a sophisticated version of this technique has been proposed. With this configuration, print data can be output by an MFP different from an MFP to which the print data has been transmitted by the user (Japanese Patent Application Laid-Open No. 2010-211627).

The system employing the remote hold printing requires MFPs to transmit and receive print data to and from each other. Before print data can be transmitted to an MFP as a requestor, the MFP needs to be authenticated as a reliable machine for the sake of security. For such authentication, a method using job information has been proposed (Japanese Patent No. 4429966).

This conventional authentication technique, related to transmission of print data between MFPs, requires the MFP in charge of printing to be connected to an authentication server machine each time the printing is executed. Thus, a long period of time can be required before print data can be printed and output.

A long period of time can also be required before the printing and outputting can be performed because the authentication is performed on job information including numerous items and is performed for each job, meaning that the authentication is performed at a high frequency.

SUMMARY

The present disclosure is directed to an image forming system with which a print job as a target of remote hold printing can be acquired from a storage location and efficiently printed while a certain level of security is guaranteed, a method for controlling the image forming system, and a related storage medium.

According to an aspect of the present disclosure, an image forming system includes a first information processing device configured to perform a first process of storing print data, a second process of receiving a device token from an external device and transmitting the device token to another external device, and a third process of transmitting requested print data to the external device, a second information processing device configured to perform a fourth process of registering the device token of the external device in a registration database, and a fifth process of receiving the device token from the external device and notifying the external device of determination information indicating whether the device token is valid based on the received device token and the registration database, and an image forming apparatus configured to perform a sixth process of receiving a print instruction and transmitting a device token of the image forming apparatus to the external device to request the external device for the print data, and a seventh process of receiving the print data from the external device and forming an image on a sheet based on the received print data, wherein, in a state where the first process is executed by the first information processing device and the fourth process is executed by the second information processing device, the image forming apparatus requests the first information processing device for the print data in the sixth process, the first information processing device receives the device token from the image forming apparatus and transmits the device token to the second information processing device in the second process, the second information processing device receives the device token from the first information processing device and notifies the first information processing device of the determination information in the fifth process, the first information processing device transmits the requested print data to the image forming apparatus in a case where the notified determination information indicates that the device token is valid in the third process, and the image forming apparatus forms the image on the sheet based on the print data received from the first information processing device in the seventh process.

Further features will become apparent from the following description of exemplary embodiments with reference to the attached drawings.

BRIEF DESCRIPTION OF THE DRAWINGS

FIG. 5 is a diagram illustrating an example of bibliographic information of the image forming apparatus.

FIGS. 9A and 9B are flowcharts illustrating a method for controlling an image forming apparatus.

FIG. 10 is a diagram illustrating management information of an access token.

DESCRIPTION OF THE EMBODIMENTS

An exemplary embodiment is described below with reference to the drawings.
<Network Configuration>

Figure 1A:
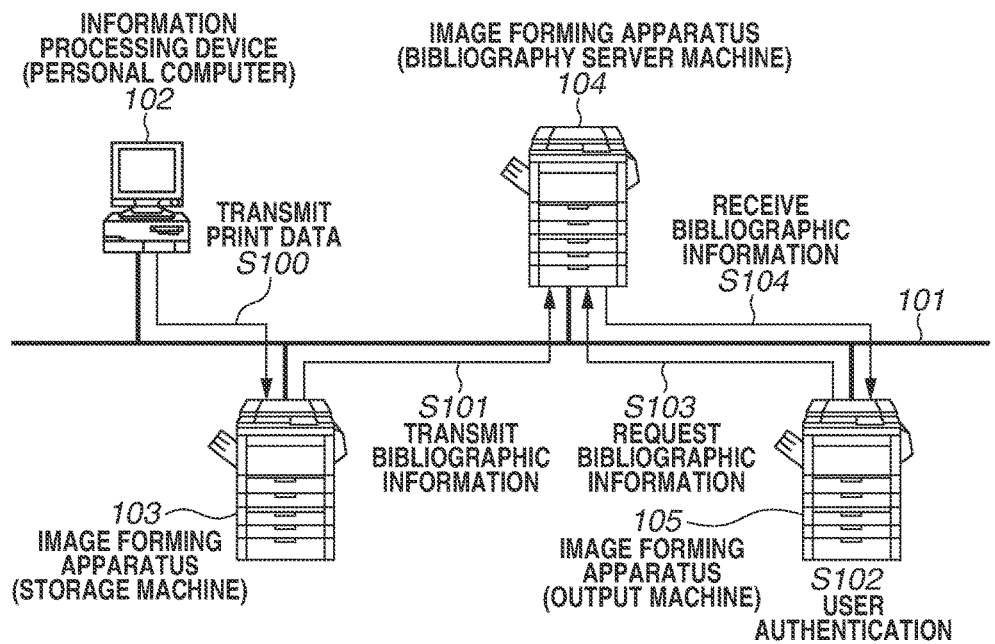
FIGS. 1A and 1B are each a diagram illustrating a configuration of an image forming system.
Figure 1B:
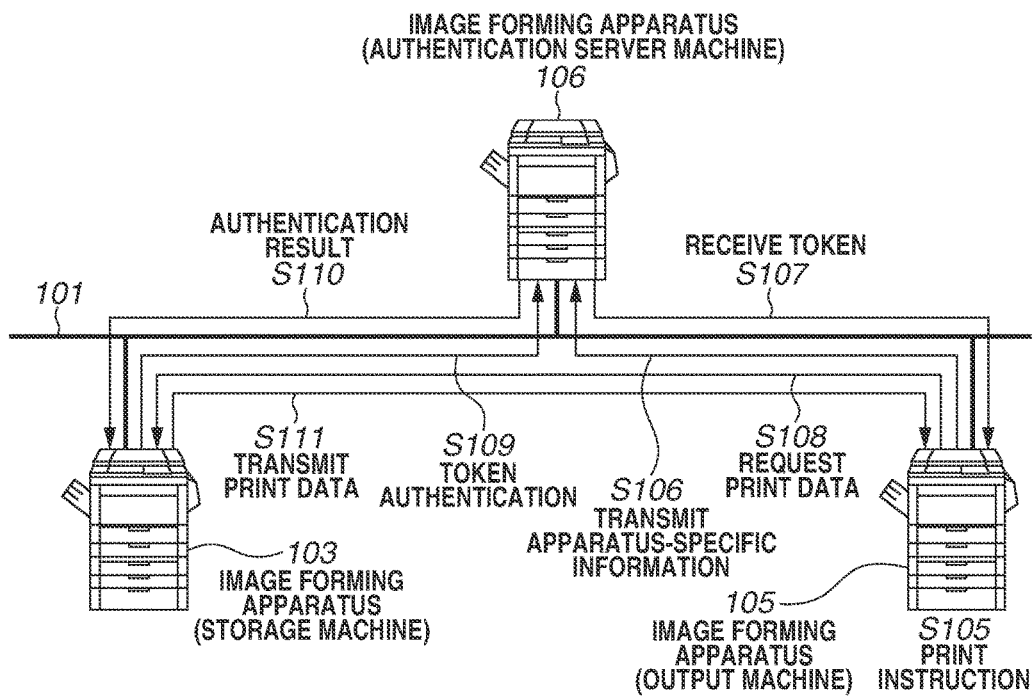

FIGS. 1A and 1B are diagrams illustrating a configuration of an image forming system including an image forming apparatus according to the present exemplary embodiment. The image forming apparatus of this example is a multi function peripheral (MFP), and the system of this example includes a plurality of MFPs and a personal computer (PC) that are communicably connected to each other via a network.

For example, a network 101 in FIGS. 1A and 1B supports Transmission Control Protocol (TCP)/Internet Protocol (IP). A PC 102 that transmits a print job and image forming apparatuses 103, 104, and 105 are connected to the network 101. The image forming apparatus can be a printer. Aspects of the present disclosure can be applied to an image forming system in which a plurality of MFPs and printers communicate with each other.

FIG. 1A illustrates a network configuration in which print data is input to an image forming apparatus and a document list is displayed on another image forming apparatus.

The image forming apparatus 103 serves as a storage machine that holds print data received from the PC 102, which serves as an information processing device, so that the print data can be output later. The image forming apparatus 104 serves as a bibliography server machine that manages bibliographic information of print data stored in other image forming apparatuses and printers. The image forming apparatus 105 acquires the bibliographic information on the print data from the image forming apparatus 104 serving as the bibliography server machine, and displays a document list. The image forming apparatus 105 serves as an output machine that prints a document selected from the document list by a user. FIG. 1A schematically illustrates a general configuration, and the system can include a plurality of PCs, storage machines, and output machines.

FIG. 1B illustrates a network configuration for performing authentication when print data, in the document list displayed on an image forming apparatus, is stored in another image forming apparatus. The image forming apparatus 105 is the output machine that prints print data selected from the document list from a user. An image forming apparatus 106 is as an authentication server machine that checks whether apparatus-specific information of an image forming apparatus that has issued an authentication request is valid, and issues an access token if the image forming apparatus that issued the authentication request is reliable.

The image forming apparatus 106 also determines whether the issued access token is valid. When transmitting print data, the image forming apparatus 103, functioning as the storage machine that stores print data, inquires of the image forming apparatus 106, serving as the authentication server machine, whether the MFP as the requestor is valid. FIG. 1B schematically illustrates a general configuration. The image forming apparatus 106, serving as the authentication server machine, can be the same as the image forming apparatus 104, serving as the bibliography server machine. The system can employ a configuration in which a plurality of storage machines and output machines is connected to each other. The authentication server machine includes a function of issuing authentication information a valid period of which is set based on device information (a serial identification (ID) for identifying an image forming apparatus) acquired from the image forming apparatus 105, as described below.

<Flow of Data for Displaying Document List>

In an example of a procedure described below, the user transmits print data from the PC 102 to the image forming apparatus 103, serving as the storage machine, and the image forming apparatus 105, serving as the output machine, displays the document list. In an example described in the present exemplary embodiment, page description language (PDL) data is transmitted to the image forming apparatus 103.

The PDL includes Laser Beam Printer (LBP) Image Processing System (LIPS) developed by Canon Inc. and PostScript developed by Adobe Systems Incorporated. The image forming apparatus 103 interprets the PDL and executes raster image processing (RIP) to perform printing. The print data is not limited to the PDL data, and can be in any format that can be interpreted and printed by the image forming apparatus 103 including, for example, Tagged Image File Format (TIFF) image data and a document format of an application.

The user starts a printer driver with an application running on the PC 102. The user performs print setting on a printer driver screen (not illustrated). Then, the user selects the image forming apparatus 103, and issues a print instruction. In this process, the user can issue an instruction clearly indicating hold printing. Upon receiving the print instruction, the printer driver displays an authentication screen (not illustrated). The print instruction is issued after the user inputs authentication information. The printer driver transmits an authentication request to the image forming apparatus 103 together with a user name and a password. An authentication service 308 of the image forming apparatus 103 checks the received user name and password, and transmits the authentication result to the PC 102. When the received authentication result indicates that the authentication has failed, the printer driver terminates print processing due to an error. When the authentication succeeds, the printer driver converts the application data into PDL data, in accordance with the designated print setting, and generates print data including user information. In step S100, the printer driver transmits the generated print data to the image forming apparatus 103.

The image forming apparatus 103, serving as the storage machine, is in charge of storing the print data, and is also in charge of extracting bibliographic information including a print data name, the print setting, and the user name in the print data. In step S101, the image forming apparatus 103 transmits the extracted bibliographic information to the image forming apparatus 104, serving as the bibliography server machine.

In step S102, the user logs into the image forming apparatus 105, serving as the output machine, by inputting the user name and the password that are the same as those input to the printer driver, when the print data stored in the image forming apparatus 103 is to be output by the image forming apparatus 105.

In step S103, the image forming apparatus 105 requests the image forming apparatus 104, serving as the bibliography server machine, for the bibliographic information. In step S104, the image forming apparatus 105 receives the bibliographic information from the image forming apparatus 104. The image forming apparatus 105 displays the document list based on the received bibliographic information.

<Flow of Transmission/Reception of Print Data>

A series of print processes is described below with reference to steps in FIG. 1B.

In step S105 in FIG. 1B, the user selects a document to be printed from the document list by using an operation unit 206 of the image forming apparatus 105, and issues a print instruction. In step S106, the image forming apparatus 105 with no access token used for authentication stored therein, transmits its apparatus-specific number to the image forming apparatus 106, serving as the authentication server machine, and thus requests the image forming apparatus 106 for the access token. In step S107, the image forming apparatus 105 receives the access token from the image forming apparatus 106, serving as the authentication server machine. In step S108, the image forming apparatus 105 requests the image forming apparatus 103, serving as the storage machine, for the print data based on the access token. In step S109, the image forming apparatus 103 requests the authentication server machine for the authentication with the access token. In step S110, the image forming apparatus 103 receives the authentication result from the image forming apparatus 106. When the authentication succeeds, in step S111, the image forming apparatus 103 transmits the print data to the image forming apparatus 105, serving as the output machine.

<Schematic Configuration of Image Forming Apparatuses 103 to 106>

Figure 2:
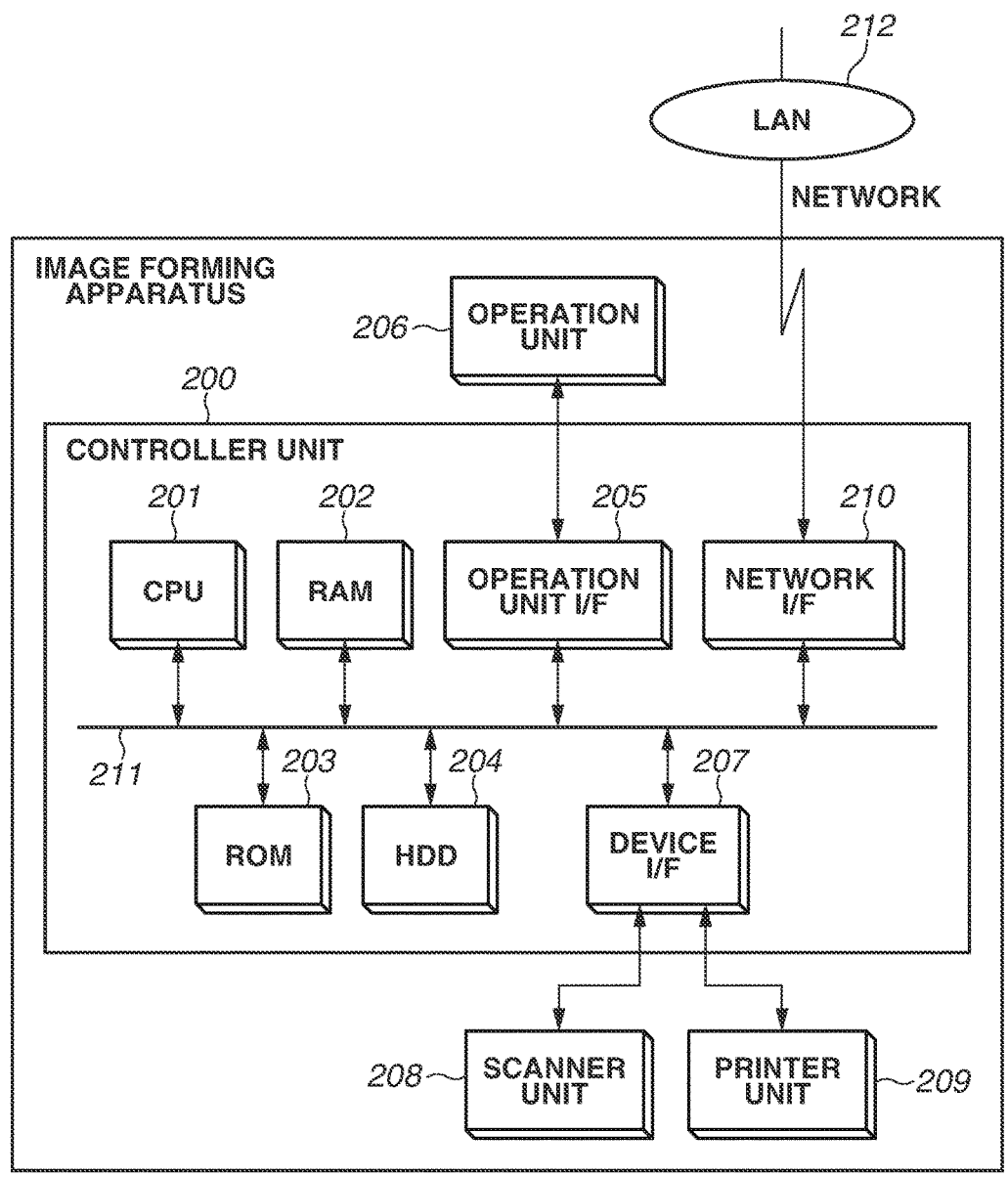
FIG. 2 is a block diagram illustrating a configuration of an image forming apparatus.

FIG. 2 is a block diagram illustrating a configuration of each of the image forming apparatuses 103 to 106 illustrated in FIGS. 1A and 1B.

A controller unit 200 in FIG. 2 controls the image forming apparatus. A central processing unit (CPU) 201 is a computing device for controlling the system as a whole. The CPU 201, a random access memory (RAM) 202, a read only memory (ROM) 203, a hard disk drive (HDD) 204, an operation unit I/F 205, a device I/F 207, and a network I/F 210 are connected to a system bus 211. The CPU 201 performs overall control over devices connected to the system bus 211. The RAM 202 stores a program, such as an operating system, system software, and application software, as well as data.

The ROM 203 stores a boot program for the system, a system program, and an application program. The ROM 203 can further store information on a font or the like required for the image forming apparatus.

The HDD 204 stores an operating system, system software, application software, image data, setting data, and the like. The CPU 201 executes a program stored in the RAM 202 to process image data and data other than the image data stored in the RAM 202, the ROM 203, or the HDD 204. A small MFP may not include the HDD 204 and can have a hard-disk-less configuration achieved with the system software, the application software, and the like stored in the ROM 203. A configuration using a storage device other than the hard disk, such as a flash memory including a solid state disk (SSD), can be used instead of the HDD 204.

The controller unit 200 includes the operation unit I/F 205, the device I/F 207, and the network I/F 210. The operation unit I/F 205 serves as an interface for the operation unit 206 including a touch panel, and outputs image data to be displayed on the operation unit 206 to the operation unit 206.

The operation unit I/F 205 notifies the CPU 201 of information input by the user of the system via the operation unit 206. The device I/F 207 establishes connection between the controller unit 200 and image input/output devices including a scanner unit 208 and a printer unit 209, and is in charge of inputting and outputting image data.

The RAM 202 and the HDD 204 store image data received from the scanner unit 208 via the device I/F 207. The image data thus stored is used as appropriate for executing image processing or the like with the application program stored in the RAM 202. Similarly, when the image data is to be output, the image data is output to the printer unit 209 via the device I/F 207.

In some configurations, such as that of a printer, the scanner unit 208 is not installed. The network I/F 210 is connected to the network, and inputs and outputs image data or information for controlling the MFP to and from external devices on the local area network (LAN) 212.

Additional configurations not illustrated that would enable practice of the exemplary embodiments are applicable. For example, the controller unit 200 of an MFP with a FAX function can include a modem device I/F, not illustrated in FIG. 2, and is connected to a public line so that a FAX can be sent. Alternatively, for example, the controller unit 200 can include a universal serial bus (USB) I/F (not illustrated) so that data stored in a flash memory card and the like can be read and printed.

The image forming apparatuses 103 to 106 according to the present exemplary embodiment have the same block configuration. For the sake of description, a component of the image forming apparatus 103 is assigned a reference numeral with a letter "a" at the end thereof, a component of the image forming apparatus 104 is assigned a reference numeral with a letter "b" at the end thereof, a component of the image forming apparatus 105 is assigned a reference numeral with a letter "c" at the end thereof, and a component of the image forming apparatus 106 is assigned a reference numeral with a letter "d" at the end thereof. In this way, the same components in difference image forming apparatuses can be distinguished from each other. For example, the CPU 201 of the image forming apparatus 103 is described as the CPU 201a.

<Software Configuration of Image Forming Apparatuses>

Figure 3:
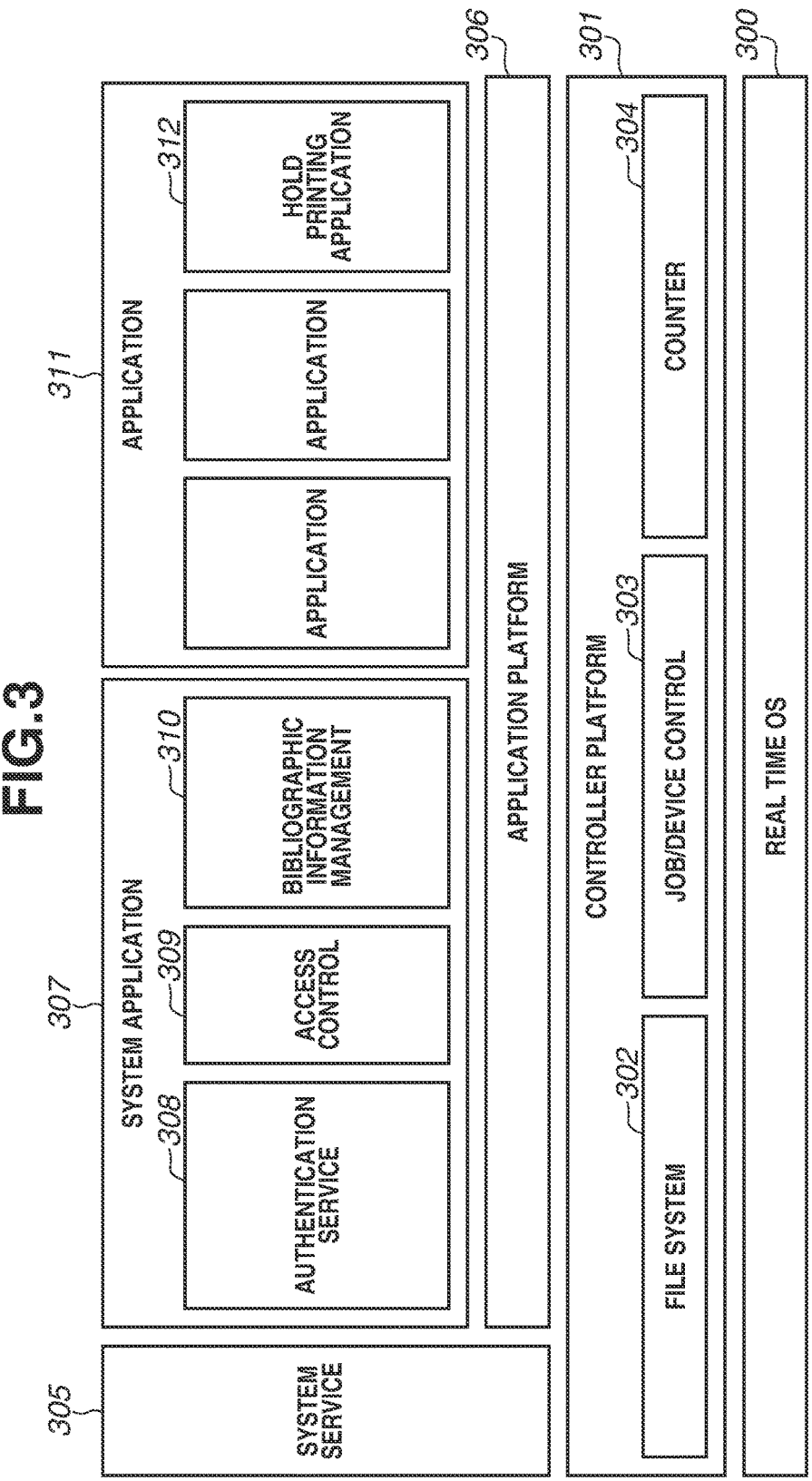
FIG. 3 is a diagram illustrating a software configuration of the image forming apparatus.

FIG. 3 is a diagram illustrating a software configuration of each of the image forming apparatuses 103 to 106 illustrated in FIGS. 1A and 1B, implemented by software embedded in the controller unit 200. Software embedded in an MFP and a printer and processed by the controller unit 200 is implemented as what is known as firmware, and is executed by the CPU 201.

A real time operating system (OS) 300 provides a service and a framework for managing various resources, optimized for controlling an embedded system, to software operating thereon. The service and the framework, for managing various resources, provided by the real time OS 300, include multitask management and inter-task communications. With the multitask management, a plurality of contexts of a plurality of processes executed by the CPU 201 is managed so that the processes are operated substantially in parallel with each other. With the inter-task communications, synchronization and data transaction between tasks are achieved.

The service and the framework also include memory management, interruption management, various device drivers, and a protocol stack as an implementation of various protocols for a local interface, a network, communications, and the like.

A controller platform 301 includes a file system 302, job/device control 303, and a counter 304. The file system 302 is a mechanism for storing data configured on a storage device such as the HDD 204 and the RAM 202, and is used for spooling a job processed by the controller unit 200 and for storing various types of data.

The job/device control 303 controls hardware such as an MFP or a printer, and jobs involving a basic function (printing, scanning, communication, image conversion, and the like) mainly provided by the hardware. The counter 304 manages a valid period of each application as well as counter values for printing and scanning.

The system service 305 is a module for monitoring an operation status of an MFP or a printer, and downloading software and a license from a software distribution server through a network.

The application platform 306 is middleware enabling a system application 307 described below and applications 311, which can be additionally provided, to use the functions of the real time OS 300 and the controller platform 301.

The system application 307 includes the authentication service 308, access control 309, and bibliographic information management 310. The authentication service 308 performs user authentication by comparing a user name and password input via the operation unit 206 or the network 101 with data in a database stored in the HDD 204.

In the present exemplary embodiment, the user authentication and the device authentication is performed with an apparatus-specific number managed. Instead of storing the database in the HDD 204, the authentication can be performed by an external authentication server machine, such as ActiveDirectory for example. The access control 309 is a security module for permitting or prohibiting an access to a job or various resources, based on user authority and security setting set to data.

The bibliographic information management 310 is a module that is installed in the image forming apparatus 104, functioning as the bibliography server machine, and manages the print data and the bibliographic information of the print data stored in MFPs connected to the bibliographic server machine via the network 101, for each user. The bibliographic information includes information on a to-be-printed document input to the MFP. Such information includes received date and time of the print data, an IP address of the MFP storing the print data, a directory path of such a local device, a print data name, and print settings.

The applications 311 are each a module that displays a menu on the operation unit 206, receives an input from the user, and provides various functions implemented by the MFPs or the printer to the user. A hold printing application 312, as one of the applications 311, displays a document list as a list of pieces of data as targets of the hold printing, issues a request and a response to the print data and a device authentication request, executes print output processing, and performs other like processing.

The image forming apparatuses 103 to 106 according to the present exemplary embodiment have the same software configuration. For the sake of description, a module of the image forming apparatus 103 is assigned a reference numeral with a letter "a" at the end thereof, a module of the image forming apparatus 104 is assigned a reference numeral with a letter "b" at the end thereof, a module of the image forming apparatus 105 is assigned a reference numeral with a letter "c" at the end thereof, and a module of the image forming apparatus 106 is assigned a reference numeral with a letter "d" at the end thereof. In this way, the same modules in different image forming apparatuses can be distinguished from each other. For example, the authentication service 308 of the image forming apparatus 103 is described as the authentication service 308a.

<Screen Displaying Document List>

Figure 4:
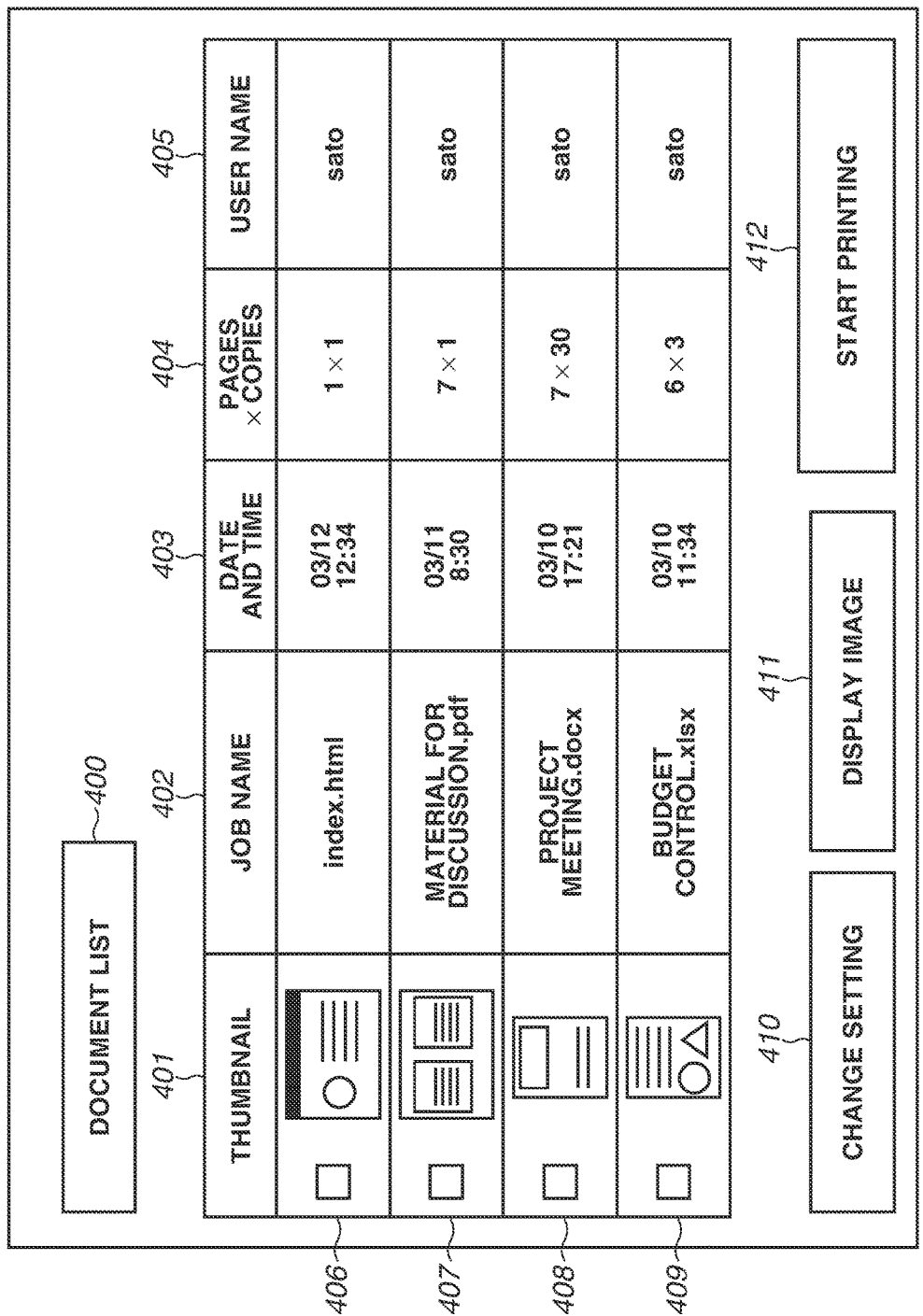
FIG. 4 is a diagram illustrating a user interface (UI) screen displayed on a display portion of an operation unit.

FIG. 4 is a diagram illustrating a user interface (UI) screen displayed on a display portion of the operation unit 206 illustrated in FIG. 2. This is an example of a list of documents displayed on the image forming apparatus 105, serving as the output machine. The application 312c, executed by the CPU 201c of the image forming apparatus 105, displays this screen on the operation unit 206c.

A document list button 400 in FIG. 4 is for displaying a list of printable documents to the authorized user. This screen includes four printable documents 406 to 409 as well as five items, displayed for each of the documents 406 to 409, including thumbnail 401, job name 402, date and time 403, pages×copies 404, and user name 405. The thumbnail 401 is for visually recognizing input documents more clearly compared with the job name 402. These items, displayed for each of the documents 406 to 409, serve as the bibliographic information and are collectively managed by the bibliography server machine. However, the preview image used for the thumbnail has a large data size and this is not used as the bibliographic information in the present exemplary embodiment.

The image displayed as the thumbnail 401 reflects the print setting. More specifically, the image as the thumbnail 401 of the document 407 is displayed as an image of a 2 in 1 page. The illustrated screen is in a state where a change setting button 410, a display image button 411, and a start printing button 412 are displayed.

<Data Structure of Bibliographic Information>

FIG. 5 is a diagram illustrating an example of the bibliographic information of the image forming apparatus 105, serving as the output machine, according to the present exemplary embodiment. The application 312 stores this information in the HDD 204c of the image forming apparatus 105.

FIG. 5 illustrates a screen with which a location where print data of the target document is stored can be identified and whether print data of the target document is located in the output machine or in another image forming apparatus can be determined, based on the IP address, in the bibliographic information, indicating a storage location. More specifically, when the IP address is set, the print data is stored in another image forming apparatus serving as the storage machine. Thus, the image forming apparatus 105, as the output machine, needs to go through authentication to acquire the print data. In this process, the document for which print data is to be acquired is designated with information on a document ID 506.

<Procedure for Starting Authentication Service>

Figure 6:
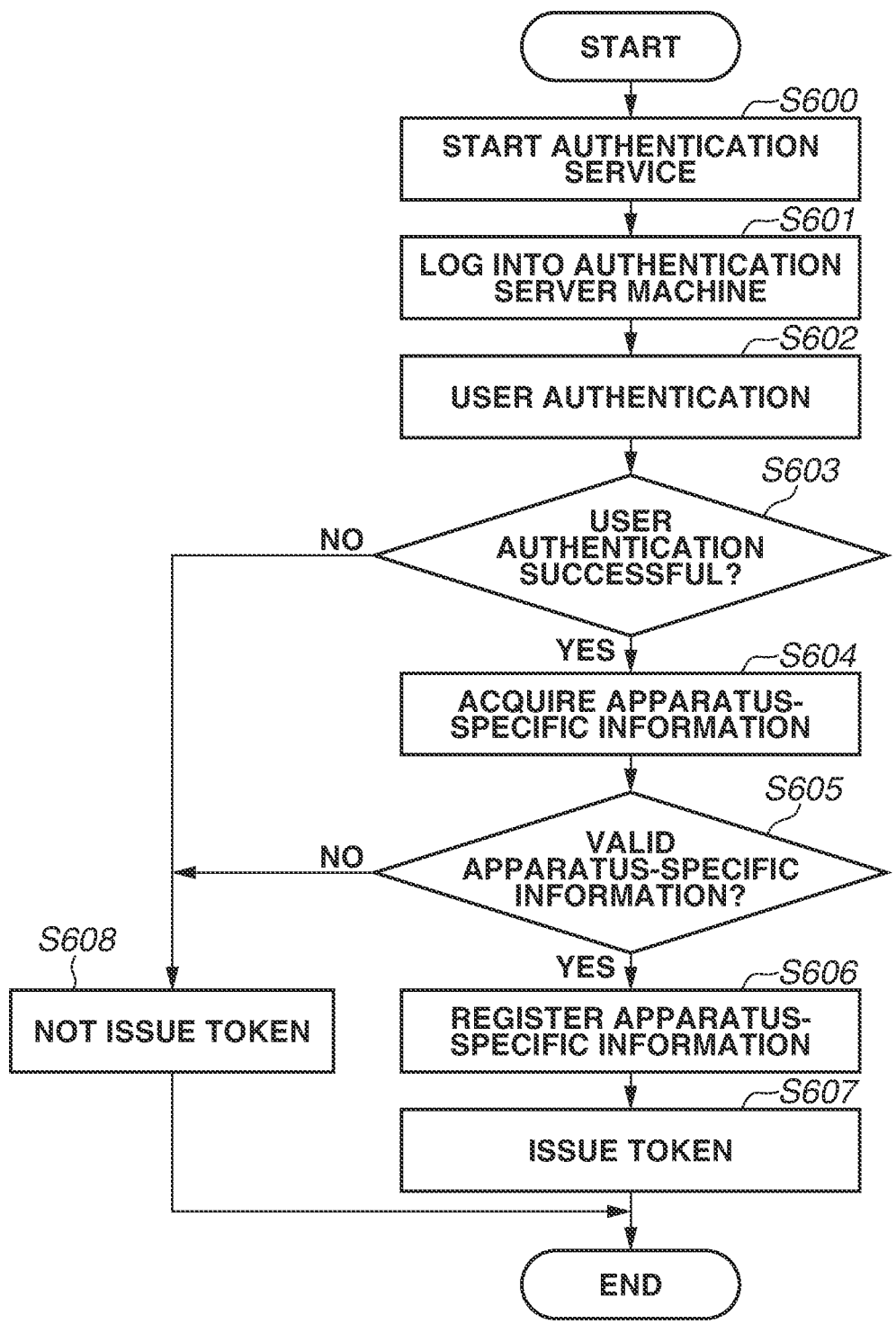
FIG. 6 is a flowchart illustrating a method for controlling an image forming apparatus.

FIG. 6 is a flowchart illustrating a method for controlling an image forming apparatus according to the present exemplary embodiment. This is an example of a procedure for starting the authentication service involving the image forming apparatus 106 as the authentication server machine and the image forming apparatus 105 as the output machine according to the present exemplary embodiment. Processes in steps S601 to S606 are implemented by the CPU 201c and the CPU 201d of the image forming apparatuses 105 and 106.

First, in step S600, the operation unit 206c of the image forming apparatus 105 starts a user authentication service. In step S602, the hold printing application 312c of the image forming apparatus 105 transmits the user information to the image forming apparatus 106 for remote login.

In step S602, the authentication service 308d of the image forming apparatus 106 performs the user authentication. The user executes authentication registration processing later with the image forming apparatus 106, and thus needs to be a user with administer authority for the image forming apparatus 106.

In step S603, the authentication service 308d determines whether the user authentication has succeeded. When the authentication service 308d determines that the user authentication succeeded (YES in step S603), the processing proceeds to step S604. In step S604, the authentication service 308d acquires apparatus-specific information, such as a device serial ID and a media access control (MAC) address, transmitted from the image forming apparatus 105.

In step S605, the authentication service 308d determines whether the apparatus-specific information satisfies a condition for configuring the apparatus-specific information and thus is valid. When the authentication service 308d determines that the information is valid (YES in step S605), the processing proceeds to step S606. In step S606, the authentication service 308d registers the apparatus-specific information as the authorized device. After the authentication service 308d registers the apparatus-specific information as the authorized device, in step S607, the authentication service 308d issues an access token corresponding to the registered information.

When the authentication service 308d determines that the user authentication has failed in step S603 (NO in step S603) or when the authentication service 308d determines that the apparatus-specific information is not valid in step S605 (NO in step S605), the processing proceeds to step S608. In step S608, the authentication service 308d does not issue any access token, and the series of processes is terminated.

<Authentication Procedure in Output Machine>

Figure 7:
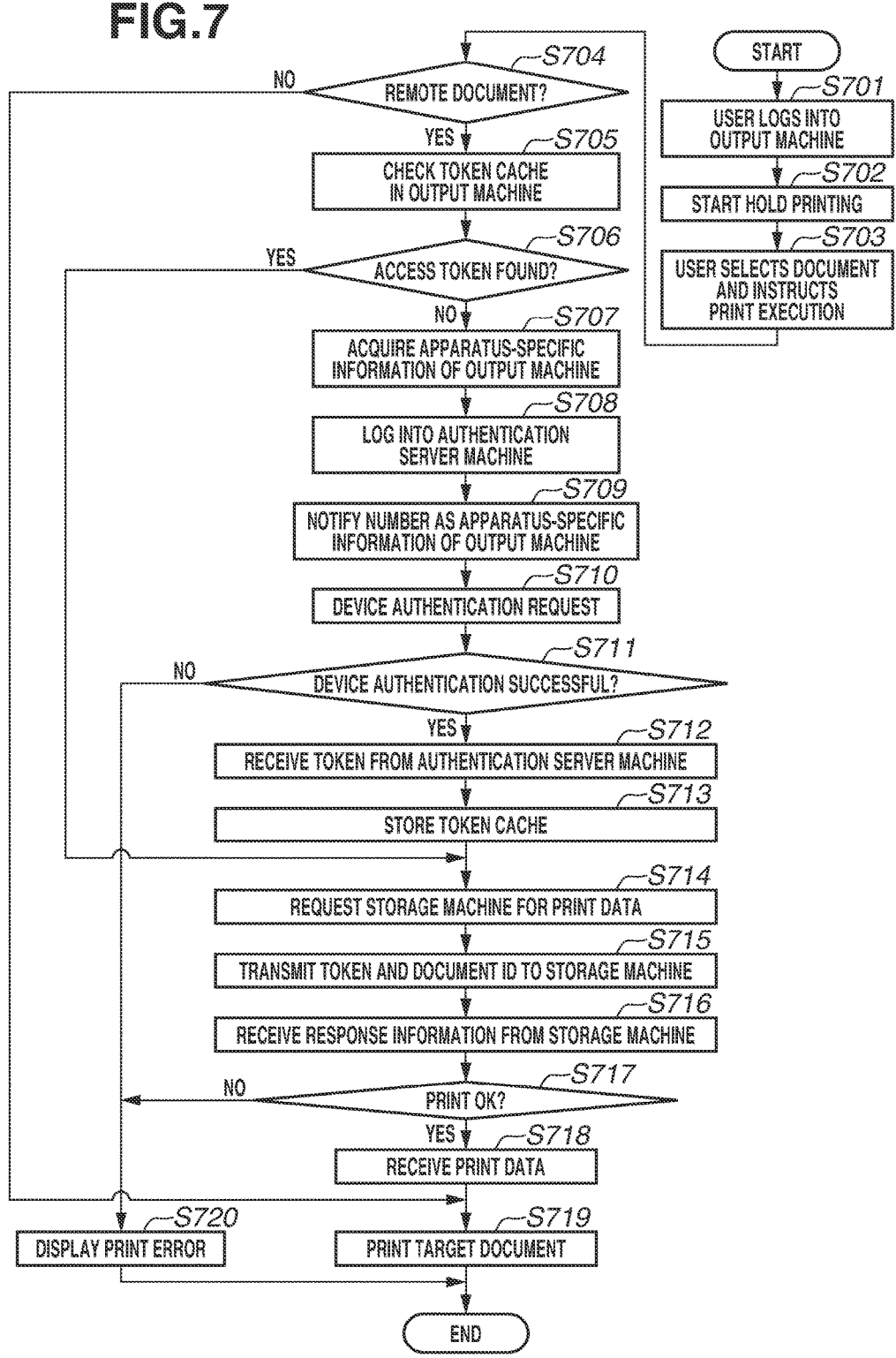
FIG. 7 is a flowchart illustrating a method for controlling an image forming apparatus.

FIG. 7 is a flowchart illustrating a method for controlling an image forming apparatus according to the present exemplary embodiment. The flowchart illustrates an example of an authentication procedure in the image forming apparatus 105 as the output machine according to the present exemplary embodiment. Processes in steps S701 to S719 are implemented by the CPU 201c of the image forming apparatus 105.

First, in step S701, the user logs into the image forming apparatus 105 by inputting the user's name and password via the operation unit 206c. This step corresponds to the user authentication in step S102 in FIG. 1A. In step S702, the user starts the application 312c, and requests the image forming apparatus 104, operating as the bibliography server machine, for the bibliographic information, and acquires the bibliographic information. This step corresponds to the bibliographic information request in step S103 and the bibliographic information reception in step S104 in FIG. 1A. In step S703, the user selects the document to be printed on the screen displaying the document list illustrated in FIG. 4, and presses the start printing button 412. This step corresponds to the print instruction in step S105 in FIG. 1B.

In step S704, the application 312c determines whether the target document is a remote document, based on the bibliographic information stored in the HDD 204c. When the target document is not a remote document (NO in step S704), the processing proceeds to step S719. In step S719, the application 312c performs printing with print data of the target document that is not a remote document and thus is stored in the HDD 204c in the image forming apparatus 105.

When the target document is a remote document (YES in step S704), the processing proceeds to step S705. In step S705, the hold printing application 312c checks whether an access token was previously acquired from the image forming apparatus 106 and cached in the HDD 204c in the image forming apparatus 105.

In step S706, the hold printing application 312c determines whether the access token has been cached in the HDD 204c in the image forming apparatus 105. When the access token is found (YES in step S706), the processing proceeds to step S714. Thus, the time required for the printing can be shortened since the processes in steps S707 to S713 for acquiring the access token is skipped.

When the hold printing application 312c determines that the access token cache is not found (NO in step S706), the processing proceeds to step S707. In step S707, the hold printing application 312c acquires the apparatus-specific information of the image forming apparatus 105. This step corresponds to the transmission of the apparatus-specific information in step S106 in FIG. 1B.

In step S708, the application 311c operating in the image forming apparatus 105 remotely logs into the image forming apparatus 106, serving as the authentication server machine. In step S709, the application 311c notifies the image forming apparatus 106 of a number as the apparatus-specific information of the output machine. In step S710, the application 311c issues a device authentication request to the image forming apparatus 106 based on the apparatus-specific information. In step S711, the application 311c receives a response, to the device authentication request, from the image forming apparatus 106, serving as the authentication server machine, and determines whether the authentication has succeeded.

When the application 311c determines that the authentication has succeeded (YES in step S711), the processing proceeds to step S712. In step S712, the application 311c operating in the image forming apparatus 105 receives an access token from the image forming apparatus 106, serving as the authentication server machine. This step corresponds to the reception of the access token in step S107 in FIG. 1B.

In step S713, the application 311c caches and stores the access token received from the image forming apparatus 106, serving as the authentication server machine, in the HDD 204c. In step S714, the application 311c requests the image forming apparatus 103, operating as the storage machine, for the print data. This step corresponds to the print data request in step S108 in FIG. 1B. In step S715, the application 311c transmits the access token and the document ID of the document corresponding to the requested print data to the image forming apparatus 103, operating as the storage machine. In step S716, the application 311c receives response information from the image forming apparatus 103. In step S717, the application 311c determines whether the print request has been accepted based on the response information received from the image forming apparatus 103.

When the application 311c determines that the print request has been accepted (YES in step S717), the processing proceeds to step S718. In step S718, the application 311c operating in the image forming apparatus 105 receives the print data from the image forming apparatus 103, operating as the storage machine. Then, in step S719, the application 311c issues a print instruction, for the received print data, to the printer unit 209c via the device I/F 207, and thus the data is output, that is, printed. Then, the processing is terminated. This step corresponds to the transmission of the print data in step S111 in FIG. 1B.

When the application 311c determines that the authentication in the image forming apparatus 106 has failed in step S711 (NO in step S711), the processing proceeds to step S720. In step S720, the application 311c displays print error on the operation unit 206c, and the cached access token corresponding to the failed authentication is deleted from the HDD 204c. Then, the processing is terminated.

<Authentication Procedure in Storage Machine>

Figure 8:
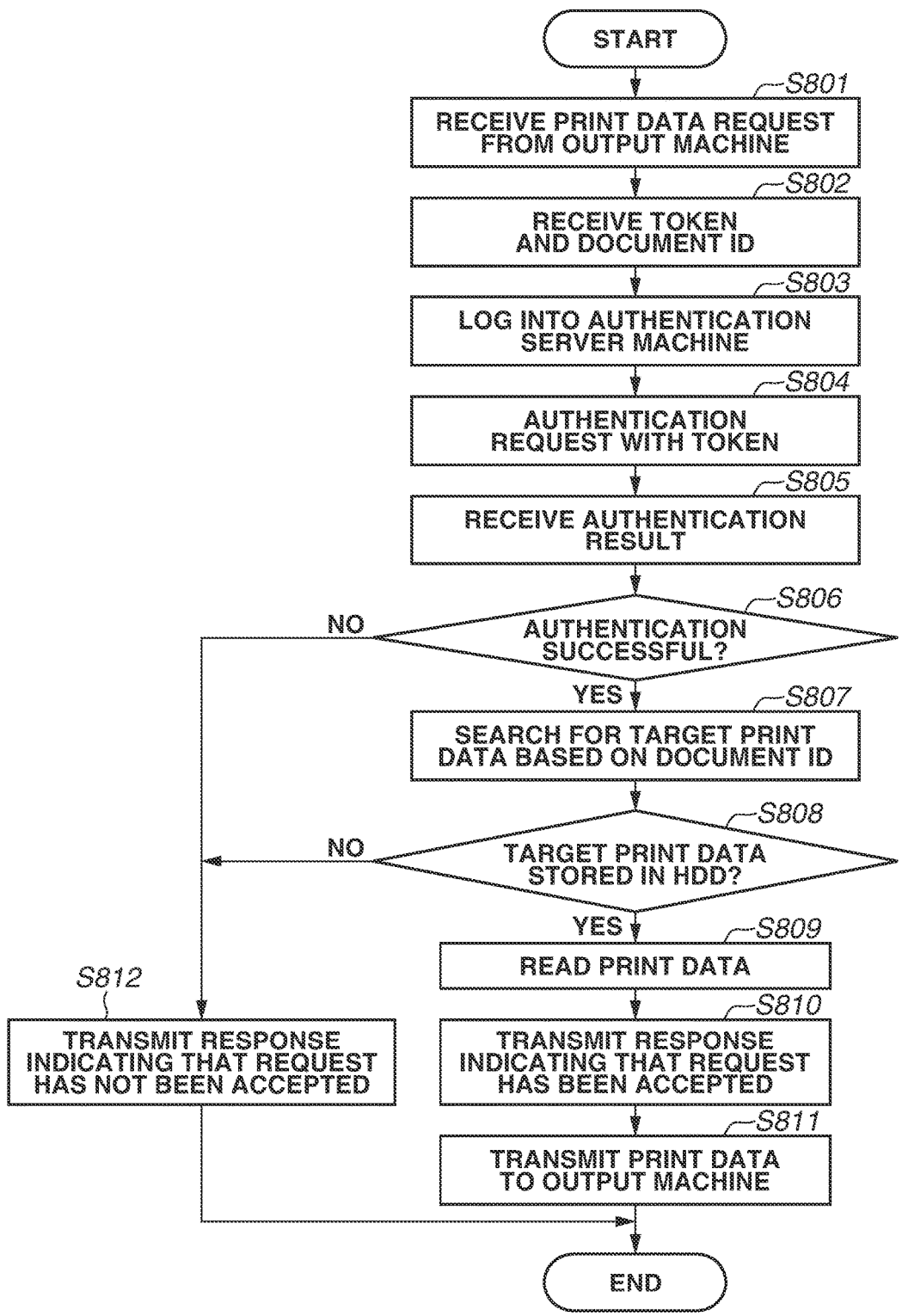
FIG. 8 is a flowchart illustrating a method for controlling an image forming apparatus.

FIG. 8 is a flowchart illustrating a method for controlling an image forming apparatus according to the present exemplary embodiment. The flowchart illustrates an example of a procedure of authentication in the image forming apparatus 103 as the storage machine according to the present exemplary embodiment. Processes in steps S801 to S812 are implemented by the CPU 201a of the image forming apparatus 103.

First, in step S801, the application 311a operating in the image forming apparatus 103 receives a print data acquisition request from the image forming apparatus 105, operating as the output machine. This step corresponds to the print data request in step S108 in FIG. 1B.

In step S802, the application 311a operating on the image forming apparatus 103 operating as the storage machine receives the access token and the document ID of the print data from the image forming apparatus 105, operating as the output machine. In step S803, the application 311a remotely logs into the image forming apparatus 106, operating as the authentication server machine.

In step S804, the application 311a issues an authentication request by notifying the image forming apparatus 106, serving as the authentication server machine, of the access token received from the image forming apparatus 105, serving as the output machine. This step corresponds to the token authentication in step S109 in FIG. 1B.

In step S805, the application 311a receives the result of the authentication request from the image forming apparatus 106, serving as the authentication server machine. This step corresponds to the reception of the authentication result in step S110 in FIG. 1B. In step S806, the application 311a determines whether the authentication result from the image forming apparatus 106, serving as the authentication server machine, indicates that the authentication has succeeded (the authentication information is valid). When the application 311a determines that the authentication result indicates that the authentication has succeeded (YES in step S806), the processing proceeds to step S807. In step S807, the application 311a searches the HDD 204 for the target print data based on the document ID received from the image forming apparatus 105, serving as the output machine.

When the application 311a determines that the authentication result from the image forming apparatus 106, serving as the authentication server machine indicates that the authentication has failed (the authentication information is invalid) in step S806 (NO in step S806), the processing proceeds to step S812. In step S812, the application 311a transmits, as a response to the print data request, a response indicating that the request has not been accepted to the image forming apparatus 105, serving as the output machine. Then, the processing is terminated.

In step S808, the application 311a determines whether the target print data is stored in HDD 204 based on the document ID. When the application 311a determines that the print data is not stored in the HDD 204 (NO in step S808), the processing proceeds to step S812. In step S812, the application 311a transmits, as a response to the print data request, a response indicating that the request has not been accepted to the image forming apparatus 105 serving as the output machine.

When the application 311a determines that the print data is stored in the HDD 204 in step S808 (YES in step S808), the processing proceeds to step S809. In step S809, the application 311a reads the print data from the HDD 204. Then, in step S810, the application 311a transmits, as a response to the print data request, a response indicating that the request has been accepted (OK) to the image forming apparatus 105, serving as the output machine. In step S811, the application 311a transmits the print data requested from the image forming apparatus 105 (output machine) to the image forming apparatus 105. Then, the series of processes is terminated. This step corresponds to the transmission of the print data in step S111 in FIG. 1B.

<Authentication Procedure in Authentication Server Machine>

FIGS. 9A and 9B are flowcharts illustrating a method for controlling an image forming apparatus according to the present exemplary embodiment. The flowchart illustrates an example of the authentication procedure in the image forming apparatus 106 as the authentication server machine. Processes in steps S901 to S905 and steps S1000 to S1006 are implemented by the CPU 201d of the image forming apparatus 106.

<Procedure of Issuing Authentication Information from Output Machine to Authentication Server Machine>

When processing illustrated in FIG. 9A starts, in step S900, the authentication service 308d operating in the image forming apparatus 106 receives an access token issue request from the image forming apparatus 105 operating as the output machine. This step corresponds to the transmission of the apparatus-specific information in step S106 in FIG. 1B. In step S901, the authentication service 308d determines whether the number as the apparatus-specific information transmitted from the image forming apparatus 105, serving as the output machine is valid based on a certain rule.

When the authentication service 308d determines that the number as the apparatus-specific information transmitted from the image forming apparatus 105, serving as the output machine is valid (YES in step S901), the processing proceeds to step S902. In step S902, the authentication service 308d determines whether the number as the apparatus-specific information was previously registered by the authentication service 308. When the authentication service 308d determines that the number has not been registered (NO in step S902), the processing proceeds to step S903. In step S903, the authentication service 308d issues an access token associated with the number as the apparatus-specific information. The access token is loaded into the RAM 202d.

In step S904, the authentication service 308d defines the issued date and time of the access token, and a valid period based on the issued date and time, and registers these items in the RAM 202d together with the access token. FIG. 10 illustrates a configuration of management information of the access token registered in this process.

In step S905, the authentication service 308d transmits the issued access token to the image forming apparatus 105, serving as the output machine that transmitted the request. This step corresponds to the reception of the token in step S107 in FIG. 1B.

In step S907, the authentication service 308d stores the access token in the RAM 202d in the HDD 204d, and stores a storage path, corresponding to the storing, as an access token storage path 1000 illustrated in FIG. 10 in the configuration of the management information.

When the authentication service 308d determines that the number as the apparatus-specific information is not valid in step S901 (NO in step S901), the processing proceeds to step S906. In step S906, the authentication service 308 transmits error information to the image forming apparatus 103 as the requestor. Then, the processing is terminated.

<Authentication Procedure from Storage Machine to Authentication Server Machine>

When processing illustrated in FIG. 9B starts, in step S1000, the authentication service 308d operating in the image forming apparatus 106 receives the authentication request based on the access token of the image forming apparatus 105, serving as the output machine from the image forming apparatus 103 operating as the storage machine.

In step S1001, the authentication service 308d acquires the access token transmitted from the image forming apparatus 106. This step corresponds to the transmission of the token authentication in step S109 in FIG. 1B. In step S1002, the authentication service 308d determines whether the acquired access token is valid.

When the authentication service 308d determines that the acquired access token is valid (YES in step S1002), the processing proceeds to step S1003. In step S1003, the authentication service 308d checks the valid period. In step S1004, the authentication service 308d determines whether the access token has expired. When the authentication service 308d determines that the access token has not yet expired (NO in step S1004), the processing proceeds to step S1005. In step S1005, the authentication service 308d transmits a response indicating the authentication result as successful to the image forming apparatus 103 as the storage machine.

When the acquired access token has been determined to not be valid (NO in step S1002) or when the authentication service 308d determines that the access token has expired (YES in step S1004), the processing proceeds to step S1006. In step S1006, the authentication service 308d transmits a response indicating the authentication result has failed to the image forming apparatus 103 as the storage machine. Then, in step S1007, the authentication service 308d deletes the referred access token, and deletes the relevant access token from the management configuration illustrated in FIG. 10. These steps correspond to the transmission of the authentication result in step S110 in FIG. 1B.

<Access Token Management Configuration>

FIG. 10 is a diagram illustrating management information for the access token managed by the authentication service 308d. This management information of the access token is stored in the HDD 204d of the image forming apparatus 106.

The access token is a simple key path and includes unique character string information. The access token is managed and operated by the controller unit 200d of the image forming apparatus 106. Software executed by the controller unit 200d is installed as what is known as firmware, and is executed by the CPU 201d.

The access token storage path 1000 in FIG. 10 indicates a storage location of the access token issued by the image forming apparatus 106 operating as the authentication server machine. Serial ID 1001 indicates a serial number unique to an MFP associated with the access token issued by the image forming apparatus 106. Issued date and time 1002 indicates the date and time at which the image forming apparatus 106 issued the access token. Valid period 1003 indicates the valid period of the access token issued by the image forming apparatus 106. Authenticated times 1004 indicate the number of times the image forming apparatus 106 has issued the access token as a response, indicating successful authentication, to the authentication request from other MFPs. Authorized times 1005 indicate the number of times the access token issued by the image forming apparatus 106 can be referred to as the authorized access token.

The validity of the authentication according to the present exemplary embodiment can be defined with the setting of time indicated by the issued date and time 1002 and the valid period 1003, or the setting of the authentication times indicated by the authenticated times 1004 and the authorized times 1005. With the configuration thus defined, the system can be flexibly configured in accordance with a security level.

According to the present exemplary embodiment, security measures can be achieved against spoofing or the like with the authentication performed by using an MFP-specific number. Furthermore, the communications between the authentication server and the same MFP can be omitted by using the access token cache. Thus, a shorter printing time can be achieved in a remote hold printing system.

With the present exemplary embodiment, a remotely held print job can be acquired from a stored location and efficiently printed, while a certain level of security is guaranteed in an image forming system.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154414, filed Aug. 5, 2016, which is hereby incorporated by reference herein in its entirety.

What is claimed is:

1. An image forming system comprising:
   a first information processing device configured to perform:
   a first process of storing print data,
   a second process of receiving a device token from an external device and transmitting the device token to another external device, and
   a third process of transmitting requested print data to the external device;
   a second information processing device configured to perform:
   a fourth process of registering the device token of the external device in a registration database, and a fifth process of receiving the device token from the external device and notifying the external device of determination information indicating whether the device token is valid based on the received device token and the registration database, and an image forming apparatus configured to perform:

a sixth process of receiving a print instruction and transmitting a device token of the image forming apparatus to the external device to request the external device for the print data, and a seventh process of receiving the print data from the external device and forming an image on a sheet based on the received print data, wherein, in a state where the first process is executed by the first information processing device and the fourth process is executed by the second information processing device:

the image forming apparatus requests the first information processing device for the print data in the sixth process, the first information processing device receives the device token from the image forming apparatus and transmits the device token to the second information processing device in the second process, the second information processing device receives the device token from the first information processing device and notifies the first information processing device of the determination information in the fifth process, the first information processing device transmits the requested print data to the image forming apparatus in a case where the notified determination information indicates that the device token is valid in the third process, and the image forming apparatus forms the image on the sheet based on the print data received from the first information processing device in the seventh process.

2. The image forming system according to claim 1, wherein the image forming apparatus is configured to perform:

a process of determining whether a valid device token is stored; and a process of transmitting, in a case where a valid device token is not stored, authentication information and device information to the second information processing device to receive the device token.

3. The image forming system according to claim 1, wherein the image forming apparatus transmits authentication information and device information to the second information processing device, and wherein the second information processing device registers a device token in the registration database in association with the device information in a case where authentication based on the authentication information succeeds and transmits the device token to the image forming apparatus.

4. The image forming system according to claim 3, wherein the authentication information is user authentication information.

5. The image forming system according to claim 4, wherein the user authentication information includes a user name and a password.

6. The image forming system according to claim 5, wherein the image forming apparatus receives the user name and the password input by an operator.

7. The image forming system according to claim 1, wherein, in the fifth process, in a case where the device token received from the first information processing device is not registered in the registration database, the second information processing device transmits, to the first information processing device, the determination information indicating that the device token is invalid.

8. The image forming system according to claim 1, wherein, in the fifth process, in a case where a valid period of the device token received from the first information processing device exceeds a valid period registered in the registration database, the second information processing device transmits, to the first information processing device, the determination information indicating that the device token is invalid.

9. An image forming method using a first information processing device, a second information processing device, and an image forming apparatus, the image forming method comprising:

storing, by the first information processing device, print data;

registering, by the second information processing device, a device token of the image forming apparatus in a registration database;

transmitting, by the image forming apparatus, the device token to the first information processing device to request the first information processing device for the print data, in response to a print instruction;

transmitting, by the first information processing device, the device token received from the image forming apparatus to the second information processing device;

notifying, by the second information processing device, the first information processing device of determination information indicating whether the device token is valid based on the device token received from the first information processing device and the registration database;

transmitting, by the first information processing device, the print data requested by the image forming apparatus to the image forming apparatus in a case where the notified determination information indicates that the device token is valid; and forming, by the image forming apparatus, an image on a sheet based on the print data received from the first information processing device.

10. A non-transitory computer readable storage medium storing a program causing an image forming system including a first information processing device, a second information processing device, and an image forming apparatus to execute an image forming method, the method comprising:

storing, by the first information processing device, print data;

registering, by the second information processing device, a device token of the image forming apparatus in a registration database;

transmitting, by the image forming apparatus, the device token to the first information processing device to request the first information processing device for the print data, in response to a print instruction;

transmitting, by the first information processing device, the device token received from the image forming apparatus to the second information processing device;

notifying, by the second information processing device, the first information processing device of determination information indicating whether the device token is valid based on the device token received from the first information processing device and the registration database;

transmitting, by the first information processing device, the print data requested by the image forming apparatus to the image forming apparatus in a case where the notified determination information indicates that the device token is valid; and forming, by the image forming apparatus, an image on a sheet based on the print data received from the first information processing device.

\* \* \* \* \*